UNITED STATES PATENT OFFICE.

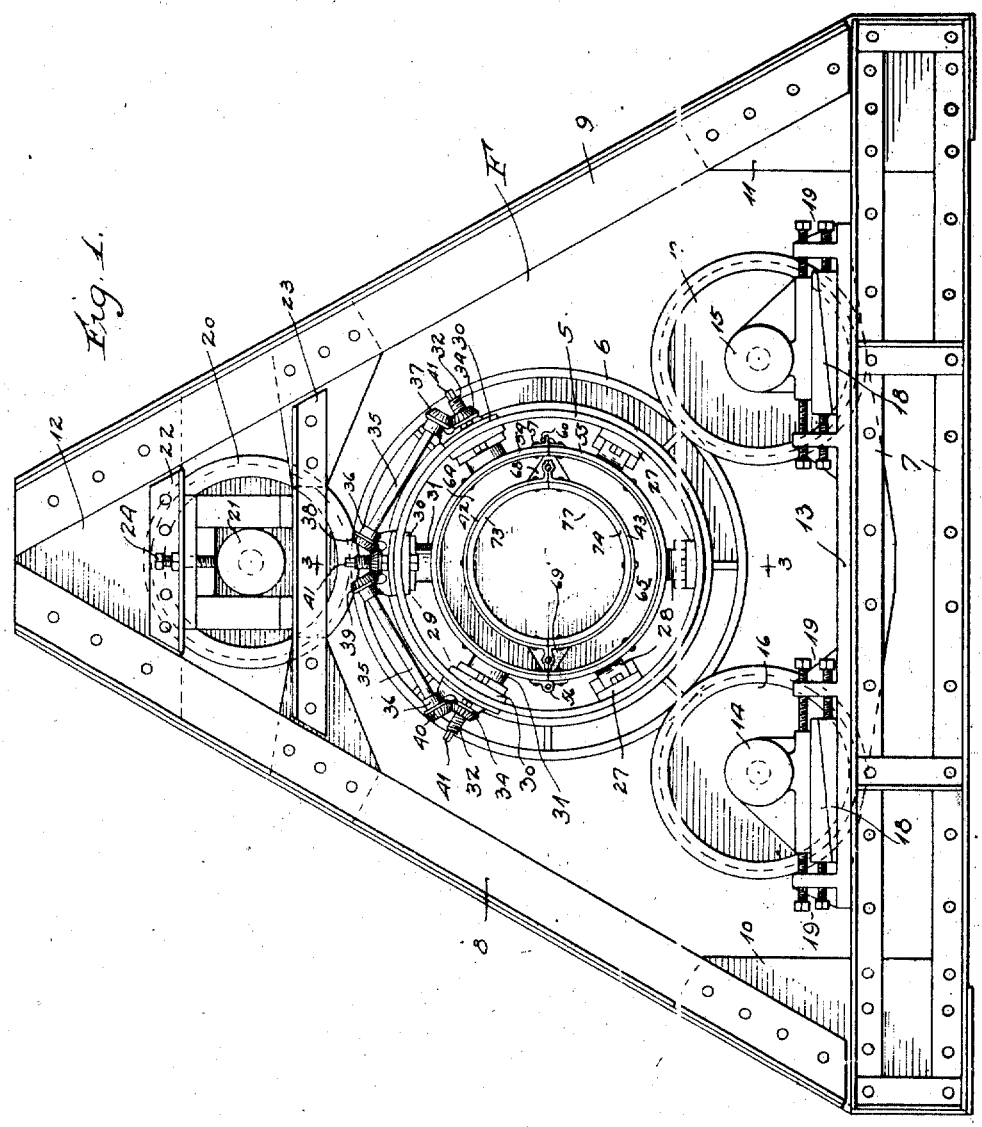

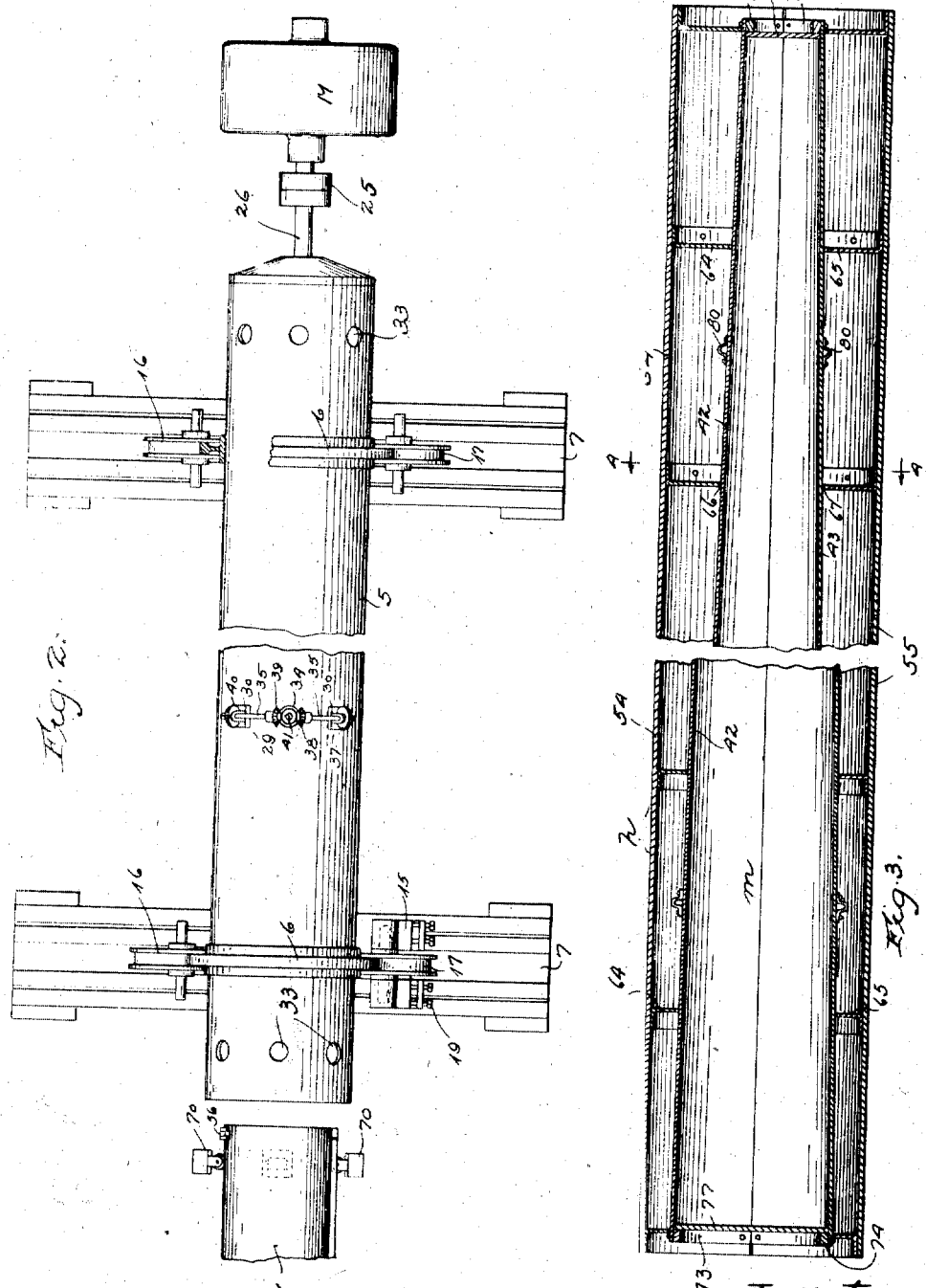

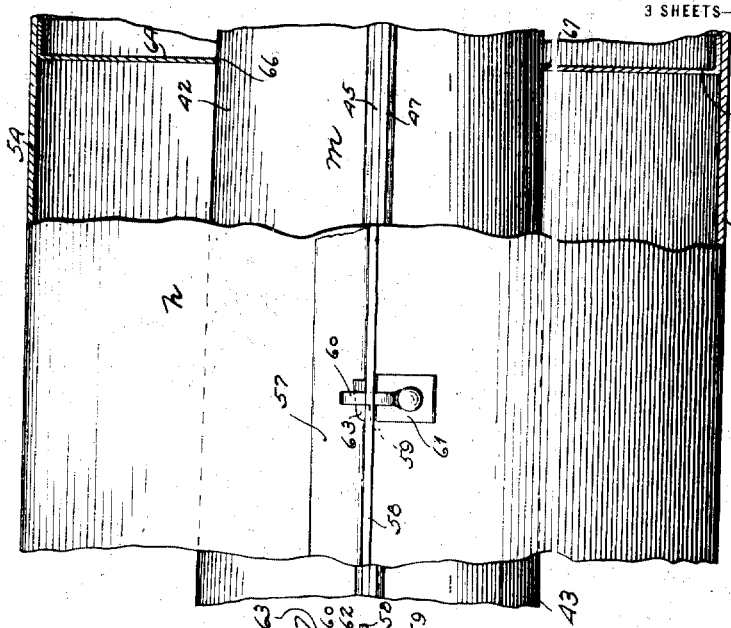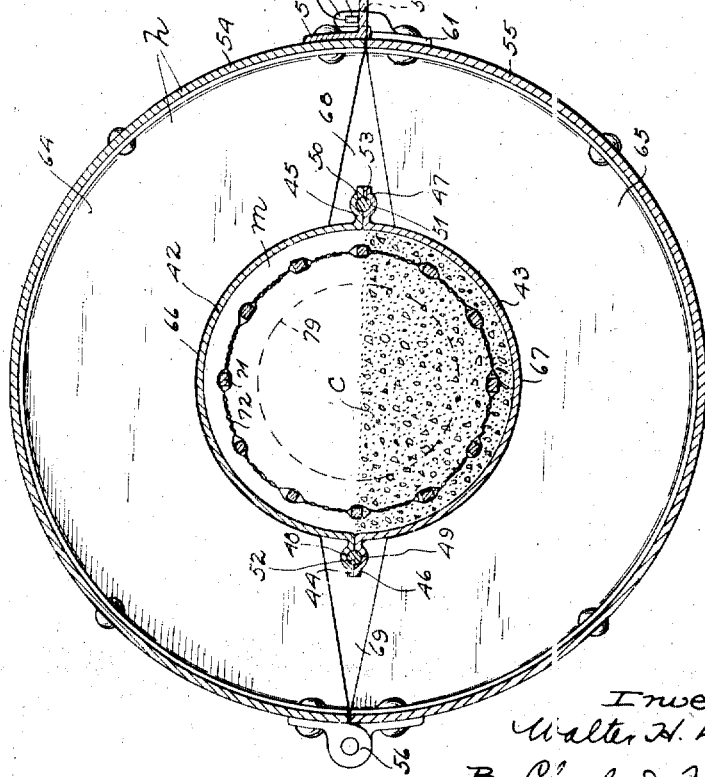

WALTER H. LIENESCH, OF CHICAGO, ILLINOIS, ASSIGNOR TO UNIVERSAL CONCRETE PRODUCTS COMPANY, OF CHICAGO, ILLINOIS, A CORPORATION OF DELAWARE.

CENTRIFUGAL CONCRETE-POLE MACHINE.

1,222,958.  Specification of Letters Patent.  Patented Apr. 17, 1917.

Application filed August 2, 1916. Serial No. 112,661.

*To all whom it may concern:*

Be it known that I, WALTER H. LIENESCH, a citizen of the United States, and a resident of Chicago, in the county of Cook and State of Illinois, have invented certain new and useful Improvements in Centrifugal Concrete-Pole Machines, of which the following is a specification.

My invention relates to concrete pole machines, particularly to that class in which concrete mixture is located and compacted in a mold by centrifugal force to form a tubular reinforced pole structure.

In my co-pending application Serial No. 74,748, filed January 28, 1916, which has matured into Patent No. 1,199,997, granted Oct. 3, 1916, I disclose a machine on which my present invention may be considered an improvement. In the machine of this co-pending application a rotatable carrier is provided with track rollers and clamps which directly receive the mold in which is the concrete mixture. With this arrangement the mold thickness varies with different sizes of pole and the entire mold with all its weight must be transported in order to remove the finished pole therefrom and must be carried back to the machine after re-filling.

The object of my invention is to provide improved construction and arrangement which will make the operation of the machine more practical and more efficient. More in detail, an important feature of the invention is the provision of a mold of light sheet metal construction, and a holder therefor which is adapted to be inserted in the carrier of the machine to be clamped therein between the rollers and clamping heads and which in turn securely clamps the halves of the supported mold together and centers the mold in the machine preparatory to axial rotation of the carrier. With this arrangement it is necessary only to transport the light mold with the finished pole, the holder being merely slid out of the machine and opened to receive the mold while it is being filled and is then closed and shifted back into the machine carrier. Another advantage of this arrangement is that one holder may serve for receiving molds of different dimensions.

On the accompanying drawings the various features of my invention are clearly illustrated, the machine being the same as that shown in my co-pending application except that my improved mold mechanism is substituted. On the drawings Figure 1 is an end elevational view of the machine, Fig. 2 is a plan view of the carrier and its supporting and driving mechanism, Fig. 3 is a sectional view of the mold mechanism on plane 3—3, Fig. 1, Fig. 4 is an enlarged side elevational view of a short length of the molding mechanism with part of the holder in diametral section, and Fig. 5 is a sectional view on plane 5—5, Fig. 4.

Briefly describing the machine supporting structure, the mold carrier 5 is in the form of a cylindrical pipe of a length suitable for the different poles to be formed. At intervals rings 6 surround the pipe to strengthen it and such rings are preferably of T-section to act as rails. With each ring or rail band is associated a supporting frame structure F suitably built up of structural iron, each frame comprising a base structure 7 from whose ends side beams 8 and 9 extend upwardly toward each other so that the resulting frames are of triangular shape, tie plates 10, 11 and 12 holding the frame parts together. On each base structure is mounted a bearing frame 13 which supports at its ends journal boxes 14 and 15 in which track wheels 16 and 17 are journaled to receive the respective rail bands on the carrier. The journal boxes are vertically and laterally adjustable by means of wedge mechanisms 18 and screws 19. To hold the carrier on the various supporting track wheels an upper track wheel 20 is provided on each frame F and journaled in a box 21 supported between the upper and lower cross beams 22 and 23, these upper track wheels being adjustable downwardly by means of screws 24 acting against the tops of the journal boxes 21. In practice the various supporting frames F are mounted in a row on a solid foundation, and driving means are provided for the carrier for causing axial rotation thereof. Preferably an electric motor M is connected by a flexible coupling 25 with the shaft 26 secured to and extending axially from the carrier.

In the carrier are means for receiving, centering and clamping mold mechanism, such means being located in suitably spaced-apart zones. In each zone at one side of a diametral plane journal boxes 27 are secured against the inner side of the carrier and journal rollers 28, while above the diametral plane are clamping devices 29. Each clamping device comprises a supporting frame 30 and a clamping head 31 radially slidable therein, screw shafts 32 extending upwardly from the heads through openings 33 provided in the carrier. Each screw shaft is threadedly engaged by a bevel gear 34 which when turned will effect inward or outward shift of the head. There may be any number of clamping devices, three being shown, and means are preferably provided for simultaneously actuating all the members of a zone. As shown, shafts 35 are journaled in extensions 36 on the frames 30 and at their ends support bevel gears 37, 38, 39 and 40, the gears 37 and 39 meshing with the bevel gear 34 of the middle clamping device and the gears 38 and 40 meshing with the gear 34 of the outer clamping devices. Each screw shaft has preferably a polygonal head 41 by means of which it may be readily turned by a tool, and upon turning of any screw shaft of a zone, the other screw shafts will be correspondingly rotated and all the clamping heads will shift simultaneously. At the beginning of an operation of the machine the carrier is in position to bring the rollers 28 below the horizontal axial plane in order that a mold structure may be shifted into the carrier on the rollers, the clamping devices being then above the horizontal plane to be brought into clamping engagement with the received mold structure.

The mold structure of my invention comprises a mold $m$ and a holder $h$. The mold consists of the two similar halves 42 and 43 which, as shown, are of semi-circular cross-section. The halves are formed from single strips of sheet metal in suitable dies, the half 42 having its ends deflected laterally to form flanges 44 and 45, and the half 43 having similar flanges 46 and 47, these flanges seating together to form the mold of circular cross-section. Within this mold is placed the cement mixture, and in order to more effectively seal the mold against escape of the mixture the opposed flanges 44, 46 and 45, 47 have the longitudinally opposed grooves 48, 49 and 50, 51 therein in which opposed grooves are received the sealing gaskets 52 and 53.

The holder for the mold comprises the sheet metal halves 54 and 55 of semi-circular cross section, the holder being cylindrical throughout when the halves are brought together and of such external diameter that it will readily fit in the machine carrier 5 between the rollers 28 and the clamping heads 31. Means are provided for securing the holder halves together and preferably the halves are hinged along one edge as by means of hinges 56 secured thereto at intervals, while at the opposite edges of the halves latch mechanism is applied. As shown, an angle bar 57 is secured along the edge of the half 54 with its leg 58 extending radially and provided with spaced holes 59 for receiving the latch tongues 60 extending from fittings 61 secured to the opposite half 55. When the halves are brought together the holes receive the tongues and the half edges are guided accurately toward each other. The tongues may be provided with cross holes 62 for receiving the wedges 63 driven therethrough and against the leg 58 of the angle bar in order to lock the holder halves together. Each holder half has a plurality of suitably spaced diametrally extending cross-walls 64 and 65 respectively whose opposed inner edges are cut out to leave notches or pockets 66 and 67, the shape of such pockets conforming with the cross-section of the mold $m$. If such mold is cylindrical as shown, the pockets are semi-circular. The ends of the cross walls adjacent the mold are cut away sufficiently to leave the clearance spaces 68 and 69 for the mold flanges.

Leading to the carrier of the machine is a trackway composed of rollers 70, and on this trackway the mold structure rests while the mold is being filled preparatory to a centrifugal treatment. The lower half 65 of the holder rests on the rollers and the top 54 is swung back on the hinges. One of the mold halves is then placed in the holder and seated in the pockets 67 of the cross walls. A metal reinforcing structure, which may consist of longitudinal rods 71 and cross wires 72, is then suspended in the mold half and the cement material $c$ poured in. In order to close the ends of the mold against escape of the cement the mold halves at one end are provided with abutment ring halves 73 and 74 and at the other with abutment ring halves 75 and 76, and end disks or heads 77 and 78 are inserted against the insides of the rings. After the cement has been poured in, the upper half of the mold is applied, the gaskets 52 and 53 serving to guide the halves into true registration and later serving to seal the mold against escape of the cement mixture. The upper half of the holder is then swung against the lower half, the pins or tongues 60 entering the holes 59 and then the wedges 62 are applied. The holder with the mold therein is then shifted along the track rollers 70 into the end of the carrier 5 and through the carrier along the track rollers 28. When the holder has been entirely inserted the clamping device actuating mechanism is operated to force the clamping heads inwardly against the top half of the holder. The top and lower holder halves are then forced together and the pressure is communicated by the cross walls 64 and 65 to the upper and lower halves of the mold, and these mold halves are securely clamped together and the gaskets compressed, and then the motor M is started and the carrier rotated axially. The resulting centrifugal action on the cement will cause it to position itself compactly against the cylindrical mold sides to form a tubular pole whose inner cylindrical surface 79 is represented by the dotted line (Fig. 5). There may be any number of clamping zones on the carrier and the spacing is preferably such that the zones will be coincident with the cross walls in the holder so that the cross walls may directly take up the clamping pressure and transmit it to the mold halves.

After the machine has been rotated sufficiently to form the pole it is stopped and the clamps are released. The holder with the mold therein is then drawn out of the carrier and back to the track rollers 70. The wedges 62 are withdrawn and the upper half of the holder is swung away. The entire mold is then withdrawn, this being readily accomplished by hooking under the mold sealing flanges. The mold halves are then pulled apart, stirrups or straps 80 being provided for receiving hooks. After removal of the concrete pole the mold halves are available for the formation of another pole and are placed in the holder as before described and the forming operation is repeated.

As the mold is constructed of comparatively thin sheet metal it is very light and it, together with the formed pole therein, can be very readily carried away from the holder. The holder itself need never be bodily carried, it being merely shifted into and out of the machine carrier. Both the core and the holder can be readily and inexpensively formed up of sheet metal.

The mold shown on the drawings is of circular cross-section and longitudinally conical or tapered, the various cross walls of the holder being cut out to intimately fit the various diameters of the pole. The same holder can be used in the formation of poles of different lengths and diameters. In Fig. 3 the holder is adapted for the formation of tapered poles of circular cross-section. If a pole is desired shorter than the length of the holder a mold of the desired length is placed in that section of the holder in which the cross walls will fit the mold. It is also evident that poles of polygonal cross-section can be formed. In this case the inner edges of the holder cross walls would have polygonal pockets for fitting the sides and width of the mold at the various sections.

I do not desire to be limited to the exact construction, arrangement and operation shown and described, as changes and modifications are no doubt possible which would still come within the scope of the invention. I claim as follows:

1. In a concrete pole machine, the combination with carrier mechanism and means for axially rotating the same, of a mold structure comprising a mold and a holder therefor, said holder being adapted to be removably inserted in said carrier mechanism to rotate therewith, and means for removably clamping said mold centrally in said holder.

2. In a concrete pole machine, the combination with carrier mechanism and means for rotating it axially, of mold mechanism comprising a holder and a mold, said holder being adapted for insertion in the carrier mechanism to rotate therewith and being longitudinally sectional whereby it may be opened to receive the mold, said mold being also longitudinally sectional whereby it may be opened to receive cement material, and opposed cross walls in the holder sections cut out at their inner ends to fit and receive the mold sections.

3. In a concrete pole machine, the combination with carrier mechanism adapted to be rotated axially and having clamping zones provided with clamping mechanism, of mold mechanism comprising a cylindrical holder and a mold, said holder being longitudinally divided into two sections hinged together at one edge whereby the holder may be opened to receive the mold, said mold being longitudinally divided into two parts, and cross walls in the holder parts shaped at their inner ends to receive and fit against the mold parts to hold these mold parts together when the holder parts are closed together, said holder being adapted to be inserted in the carrier mechanism to receive the pressure of the clamping mechanism against its parts and to transmit the pressure through the cross walls to the mold parts to securely lock the mold parts together during rotation of the holder with the carrier mechanism.

4. In a concrete pole machine, the combination with axially rotatable carrier mechanism having clamping zones provided with centering and clamping mechanism, of a cylindrical mold holder divided longitudinally into upper and lower halves, said halves being hinged together at one edge, a mold divided longitudinally into upper and lower halves, cross walls in said holder halves shaped at their inner ends to receive the upper and lower halves of the mold, said holder being adapted to be inserted in the carrier mechanism to receive the pressure of the clamps against its halves and to transmit such pressure to the mold halves, whereby said mold halves are rigidly locked together during rotation of the holder with the carrier mechanism.

5. In a concrete pole machine, the combination with a cylindrical carrier, radial clamping mechanism in said carrier and means for rotating said carrier axially, of a mold holder divided longitudinally into upper and lower halves, said halves being hinged along one edge whereby they may be separated, a mold divided into upper and lower separable halves, sets of opposed cross walls in the holder halves cut out at their inner ends to receive the mold halves and to center the mold axially in said holder, said holder fitting into said carrier to be engaged by the radial clamping mechanism, the pressure of said clamping mechanism against the holder halves being transmitted by the holder cross walls to the mold halves whereby such mold halves are securely locked together during rotation of the holder with the carrier.

6. In a concrete pole machine, the combination with axially rotatable carrier mechanism divided into clamping zones, track rollers at the lower parts of said zones and radial clamping mechanism at the upper part of the zones, of a mold holder divided longitudinally into upper and lower halves, said holder being adapted to be inserted in the carrier mechanism with its lower half resting on the track rollers and its upper half in position to be engaged by the clamping mechanism, a mold divided into upper and lower separable halves, sets of opposed cross walls in said holder halves cut out at their inner ends to receive and fit the upper and lower mold halves to thereby center the mold in the holder, the pressure of the carrier clamping mechanism on the holder being transmitted by the holder cross walls to the mold halves whereby said mold halves are securely held together during rotation of the holder with the carrier mechanism.

7. A mold holder for centrifugal concrete pole machines divided longitudinally into upper and lower halves, and cross walls in said halves shaped at their inner ends to receive and center a mold in the holder.

8. A mold holder for centrifugal concrete poles comprising two semi-cylindrical halves hinged along one edge and provided with latch mechanism at the other edges, pairs of opposed cross walls in said halves cut out at their axial sections to receive and fit the sides of a mold and to center the mold in the holder axially.

9. In a centrifugal pole machine, the combination of a mold holder comprising upper and lower semi-cylindrical halves hinged together along one edge and provided with latching mechanism at the opposite edges, a mold divided longitudinally into upper and lower halves, and pairs of opposed cross walls in said holder halves cut out at their inner ends to receive the halves of the mold and to center the mold in the holder.

10. A mold for concrete poles divided longitudinally into upper and lower halves, flanges extending radially from the edges of said halves, said flanges being grooved, and gaskets inserted in said grooves to be compressed between the flanges to seal the mold.

11. A mold for concrete pole machines comprising longitudinally extending halves of sheet metal, flanges extending radially from the edges of the halves, said flanges being deflected to form longitudinal channels, the channels in opposed flanges registering, and gaskets inserted between the opposed grooves to seal the mold.

In witness whereof I hereunto subscribe my name this 29th day of July, A. D. 1916.

WALTER H. LIENESCH.